Jan. 28, 1964     R. A. LANCASTER     3,119,175
APPARATUS FOR ASSEMBLING THREADED ARTICLES
Filed Aug. 25, 1960
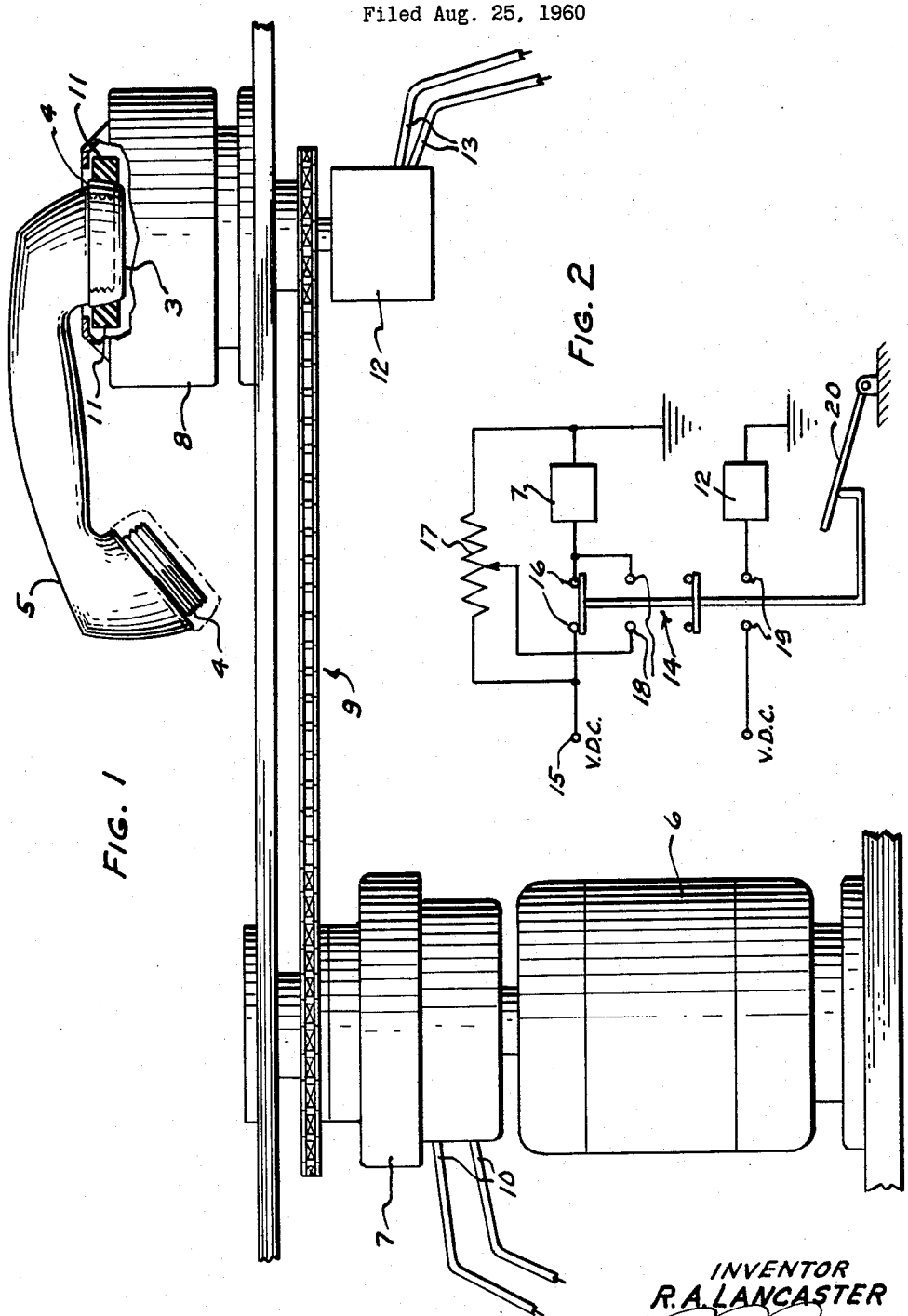

United States Patent Office 3,119,175
Patented Jan. 28, 1964

3,119,175
APPARATUS FOR ASSEMBLING THREADED ARTICLES
Robert A. Lancaster, Indianapolis, Ind., assignor to Western Electric Company, Incorporated, New York, N.Y., a corporation of New York
Filed Aug. 25, 1960, Ser. No. 51,869
6 Claims. (Cl. 29—240)

This invention relates to apparatus for screwing threaded articles onto other threaded articles, and more particularly, it relates to the application of transmitter and receiver caps to the handles of telephone handsets. One object of this invention is to provide an improved apparatus of such a character.

The invention, as practiced in this preferred embodiment, employs certain apparatus which is disclosed and claimed in detail in Patent No. 2,767,465, issued October 23, 1956, to C. C. McCain, and is particularly adapted to the application of transmitter and receiver caps to the handles of telephone handsets. This conventional apparatus includes a limited-torque clutch which is arranged to transmit the torque of a motor to a chuck. The rotating chuck is closed to grip a cap and rotatably apply it to the handle of a telephone handset. The handle is maintained in position and kept from rotating while the chuck turns the cap onto the threaded portion of the handle. When the cap is tightened to the desired degree, the clutch slips and the chuck stops rotating. The chuck is then opened to release the tightened cap and the open chuck is accelerated in preparation for the next application cycle.

Chucks which are commonly employed to grip the cap can be characterized as having large moments of inertia about their axes of rotation, due to their large diameters. The torque required to accelerate such a chuck at a sufficiently high rate is substantially greater than that torque with which it is desired to tighten the cap. Therefore, where the maximum torque transmittable to the chuck is maintained at the value desired for tightening of the cap, the chuck is accelerated slowly, and the time interval required for each application cycle is unduly long.

The preferred embodiment of the invention calls for the use of a clutch which will permit selective control of the maximum torque transmittable to the chuck. With this improvement, the maximum torque transmittable to the chuck is alternately increased and decreased, so that the chuck can be rapidly accelerated by application of a relatively large torque, and the caps can be applied with the desired degree of tightness through the application of a lesser torque. The control of the maximum torque transmittable to the chuck is effected in cooperation with the opening and closing of the chuck, so as to insure that the chuck will never be in a closed condition when the clutch is energized sufficiently to transmit the higher torque required for rapid acceleration.

It is another object of the present invention to provide an improved apparatus for applying threaded articles to other threaded components, which apparatus is faster and more efficient than the apparatus previously used.

Another object of the invention is to provide an improved apparatus for applying threaded caps to the handles of telephone handsets, which apparatus is faster and more efficient than the apparatus previously used.

Another object of the invention is to provide an improved apparatus for alternately increasing and decreasing the maximum torque transmittable to a chuck, in order that the chuck may tighten a threaded cap at a desired torque and be rapidly accelerated upon application of a higher torque in preparation for the application of the next cap.

A further object of the invention is to provide simple electrical control means whereby alternate increase and decrease of the maximum torque transmittable to a chuck for rapidly accelerating the chuck and for applying the caps are automatically coordinated with the opening and closing of the chuck, so as to insure that the chuck is open whenever the clutch is energized sufficiently to transmit the torque required for proper acceleration of the chuck, and to insure that the torque transmittable to the chuck is limited to the lesser value desired for cap application whenever the chuck is closed.

Other objects and advantages of the invention will become apparent by reference to the following description when read in conjunction with the accompanying drawing, in which:

FIG. 1 is an elevational view of apparatus illustrating the present invention; and FIG. 2 is a diagram of the control circuitry therefor.

The apparatus involved in the preferred embodiment illustrated in FIG. 1 is designed to apply internally threaded transmitter and receiver caps 3 to the threaded portions 4 of the handle 5 of a telephone handset. A motor 6 is connected to an electromagnetic variable-torque clutch 7, which transmits the torque of the motor 6 to a rotatable chuck 8, through a chain drive 9. The torque transmittable to the chuck 8 is limited by the electromagnetic clutch 7, the maximum value of torque transmittable by the clutch 7 being controlled by the voltage applied to the control terminals 10 of the clutch 7.

The chuck 8 includes movable jaws 11 which assume open and closed positions to grip and release successive caps 3. The jaws 11 are controlled by a solenoid operated air valve 12 in accordance with power applied to solenoid terminals 13.

Referring in particular to FIG. 2, a switch 14 is arranged to apply selectively to the clutch 7 either the full voltage of a source 15 by connecting the contacts 16, or the voltage appearing across one arm of a potentiometer 17 by connecting the contacts 18. The application of the two alternate values of voltage to the clutch 7 produces two alternate values of maximum torque transmittable to the chuck 8 by the clutch 7, one value of torque being that which is sufficient to accelerate the chuck 8 rapidly, and the other, lesser value, being that which is desirable for tightening the caps 3.

The switch 14 is also arranged to permit the application of power to the solenoid operated valve 12 by connecting the contacts 19, or to break this circuit by disconnecting the contacts 19. Operation of the switch 14, therefore, also effects the opening and closing of the chuck jaws 11.

The contacts 16, 18, and 19 are arranged so that as switch 14 is actuated by a foot pedal 20, the contacts 16 are disconnected at least as soon as the contacts 19 are connected, and as the foot pedal 20 is moved upwardly, the contacts 19 are disconnected at least as soon as the contacts 16 are connected. This insures that the jaws of the chuck will be open whenever the clutch is sufficiently energized to transmit the high value of torque required to accelerate the chuck rapidly, the torque transmittable to the chuck being limited to the lesser value desired for cap application whenever the chuck is closed.

An understanding of the operation of the apparatus can be gained from the following detailed explanation of the application cycle for a single cap. A cap 3 is placed in the chuck 8 while the foot pedal 20 is in its upward position. The contacts 19 are open so that the solenoid operated valve 12 is deenergized and the jaws 11 are open. The contacts 16 are connected to provide for the direct application of the source voltage 15 to the control element of the clutch 7 such that the value of maximum torque transmittable to the chuck 8 is sufficient to accelerate the chuck at the prescribed rate.

The operator then depresses the foot pedal 20, disconnecting the contacts 16 and connecting the contacts 18 and the contacts 19. The value of voltage applied to the control element of the clutch 7 is thus reduced, and the value of maximum torque transmittable to the chuck 8 is reduced to that value which is desirable for the application of a cap. The connecting of the contacts 19 energizes the solenoid of the valve 12 and closes the chuck jaws 11 to grip the cap. The operator then moves the threaded portion 4 of the handle 5 into engagement with the cap, and the cap is applied to the handle 5 with the desired degree of tightness. When the cap is tightened to the desired degree, the clutch slips and the chuck is brought to rest.

The operator then allows the foot pedal 20 to move to its upward position, connecting the contacts 16, and disconnecting the contacts 18 and 19. The chuck jaws are thus opened to release the tightened cap, and the value of the maximum torque transmittable to the chuck is increased to that value required to accelerate the chuck properly in preparation for the application of the next cap.

An improved apparatus which effects the rapid and efficient application of threaded articles to other threaded components has now been disclosed. In accordance with this apparatus, the maximum torque transmittable to a chuck which applies threaded caps to threaded handles is increased to accelerate the chuck rapidly from standstill, and is decreased to tighten the caps properly. Voltage selecting means, including the contacts 16 and the contacts 18, electrically control the maximum torque transmittable to a chuck which screws threaded caps onto threaded components. Switch means including the contacts 19 effect the opening and closing of the chuck to grip and release a cap. These means have a common mechanical actuator to insure that the opening and closing of the chuck is coordinated with the selective control of the maximum torque transmittable to the chuck.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In apparatus employing a motor and a chuck for rotatably applying threaded articles to threaded components at a desired torque of lesser magnitude than that torque required to accelerate the chuck at a prescribed rate, control means comprising a torque-limiting clutch responsive to changes in voltage applied thereto and arranged to transmit a limited torque from the motor to the chuck, voltage selecting means for selectively energizing said clutch to control the maximum torque transmittable to the chuck, switch means for effecting opening and closing of the chuck, and means for jointly operating said voltage selecting means and said switch means to decrease the maximum torque transmittable to the chuck to a predetermined positive value desired for article application at least as soon as the chuck is closed, and to open the chuck at least as soon as the maximum torque transmittable to the chuck is increased to the value required for acceleration of the chuck at the prescribed rate.

2. In apparatus employing a motor, a chuck, and a torque-limiting clutch arranged to transmit a limited torque from the motor to the chuck for rotatably applying threaded articles to threaded components at a desired article-tightening torque, and for accelerating the chuck with an accelerating torque substantially larger than the article-tightening torque, control means comprising voltage selecting means for selectively energizing the clutch to control the maximum torque transmittable to the chuck, switch means for effecting opening and closing of the chuck, and means for jointly operating said voltage selecting means and said switch means to decrease the maximum torque transmittable to the chuck to a predetermined positive value desired for article application at least as soon as the chuck is closed, and to open the chuck at least as soon as the maximum torque transmittable to the chuck is increased to the value required for acceleration of the chuck at the prescribed rate.

3. In apparatus employing a motor and a chuck for rotatably applying threaded articles to threaded components at a desired torque of lesser magnitude than that torque required to accelerate the chuck at a prescribed rate, switch means for effecting opening and closing of the chuck, a torque-limiting clutch connecting the motor to the chuck for limiting the torque transmitted to the chuck, voltage selecting means for selectively conditioning said clutch to limit the torque transmitted by said clutch to the chuck alternately to the value desired for application of the articles and the value required for prescribed acceleration of the chuck, means for jointly operating said switch means and said voltage selecting means to decrease the torque applied to the chuck through said clutch to a predetermined positive value desired for article application at least as soon as the chuck is closed, and to open the chuck at least as soon as the torque applied to the chuck is increased to the value required for prescribed acceleration of the chuck.

4. In apparatus employing a motor and a chuck for rotatably applying threaded articles to threaded components at a desired torque of lesser magnitude than that torque required to accelerate the chuck at a prescribed rate, control means comprising a torque-limiting clutch responsive to changes in voltage applied thereto and arranged to transmit the torque of the motor to the chuck, voltage selecting means including a first switch contactor for selectively energizing said clutch to control the maximum torque transmittable to the chuck, switch means including a second switch contactor for effecting opening and closing of the chuck, and mechanical means to cooperatively actuate said first and second switch contactors for jointly operating the chuck and said torque-limiting clutch to decrease the maximum torque transmittable to the chuck to a predetermined positive value desired for article application at least as soon as the chuck is closed, and to open the chuck at least as soon as the maximum torque transmittable to the chuck is increased to the value required for acceleration of the chuck at the prescribed rate.

5. Apparatus and control means as specified in claim 2 wherein the torque-limiting clutch transmits the torque of the motor to the clutch by electromagnetic means, whereby the maximum torque transmittable to the chuck is a function of the voltage applied to the clutch.

6. In apparatus employing a motor and a chuck for rotatably applying threaded articles to threaded components at a desired torque of lesser magnitude than that torque required to accelerate the chuck at a prescribed rate, a torque-limiting clutch drivingly connecting the motor and the chuck, means for regulating said torque-limiting clutch to control the maximum torque transmittable from the motor to the chuck by said torque-limiting clutch, means for opening and closing the chuck, and control means for jointly operating the clutch regulating means and the chuck opening and closing means to decrease the maximum torque transmittable to the chuck to a predetermined positive value desired for article application at least as soon as the chuck is closed, and to open the chuck at least as soon as the maximum torque transmittable to the chuck is increased to the value required for acceleration of the chuck at the prescribed rate.

References Cited in the file of this patent

UNITED STATES PATENTS

| | | |
|---|---|---|
| 2,286,809 | Hutchison | June 16, 1942 |
| 2,518,009 | Hess | Aug. 8, 1950 |
| 2,726,028 | Saumsiegle | Dec. 6, 1955 |
| 2,752,671 | Alyea | July 3, 1956 |
| 2,767,465 | McCain | Oct. 23, 1956 |